United States Patent [19]

Shanley, II et al.

[11] 4,376,288

[45] Mar. 8, 1983

[54] SIGNAL GAIN CONTROL WITH DC COMPENSATION

[75] Inventors: Robert L. Shanley, II; Robert P. Parker, both of Indianapolis, Ind.

[73] Assignee: RCA Corporation, New York, N.Y.

[21] Appl. No.: 296,864

[22] Filed: Aug. 27, 1981

[51] Int. Cl.³ ............................................. H04N 5/16
[52] U.S. Cl. ..................................... 358/39; 358/169; 358/34
[58] Field of Search .................... 358/21 R, 37, 39, 40, 358/160, 169, 171, 172, 174, 176, 34; 330/11, 250, 254, 259, 261, 267, 268, 270, 273, 278, 285, 290, 296

[56] References Cited

U.S. PATENT DOCUMENTS

| | | | |
|---|---|---|---|
| 3,737,796 | 6/1973 | Legler | 330/29 |
| 3,804,981 | 4/1974 | Avins | 178/7.3 |
| 3,873,767 | 3/1975 | Okada et al. | 178/7.5 |
| 4,013,972 | 3/1977 | Nishitoba et al. | 330/29 |
| 4,197,557 | 4/1980 | Tuma et al. | 358/34 |
| 4,209,808 | 6/1980 | Harwood | 358/39 |
| 4,253,110 | 2/1981 | Harwood et al. | 358/39 |

*Primary Examiner*—Michael A. Masinick
*Attorney, Agent, or Firm*—Eugene M. Whitacre; Peter M. Emanuel; Ronald H. Kurdyla

[57] ABSTRACT

The DC output level of a video signal amplifier is compensated to remain constant as the amplifier is gain controlled in response to a gain control voltage supplied from a gain control circuit which also supplies a DC compensation voltage to the amplifier. The DC compensation is preserved by means of an additional network which senses the DC bias of both the amplifier and the gain control circuit, and corrects a deviation of the amplifier bias and the gain control circuit bias from a prescribed mutual relationship. The sensed DC bias of the gain control circuit is also used to establish a black reference level for the video signal.

21 Claims, 3 Drawing Figures

SIGNAL GAIN CONTROL WITH DC COMPENSATION

This invention concerns a control circuit which operates in conjunction with a signal gain control network to assure that the DC level of a signal is properly compensated to remain substantially constant as the signal is gain controlled.

A video signal processing system such as a television receiver typically includes provision for adjusting the peak-to-peak amplitude of the video signal (e.g., to vary the contrast of a reproduced image). It is often desirable to maintain the DC level of the video signal substantially constant as the peak-to-peak amplitude of the video signal is varied, in order to facilitate the DC coupling of the controlled video signal to subsequent signal processing circuits and to avoid undesired changes in the brightness of a reproduced picture as the video signal amplitude is controlled.

Varying the amplitude of a video signal is often accomplished by applying a gain control voltage derived from a gain control circuit to a video amplifier for controlling the amplifier gain, and by interconnecting the gain control circuit and the controlled amplifier such that a variable compensating voltage is DC coupled from the gain control circuit to the controlled amplifier. The compensating voltage exhibits a magnitude and sense for maintaining the quiescent output voltage of the controlled amplifier constant as the amplifier is gain controlled.

Proper DC compensation in a gain control arrangement of this type typically requires that certain design operating parameters of the gain control circuit and the controlled amplifier exhibit a prescribed relationship. For example, in some instances proper DC compensation would be impaired if the quiescent operating conditions of the controlled amplifier and the gain control circuit deviate from a desired mutual relationship. This can be caused by a variety of factors, including temperature effects and operating supply voltage variations, for example. The control circuit disclosed herein is arranged to substantially reduce the effects of such quiescent condition deviation upon the desired gain control DC compensation.

Apparatus according to the present invention is included in a video signal processing system wherein the DC output level of a gain controlled video signal amplifier is intended to remain substantially constant as the amplifier is gain controlled. Amplifier gain control and DC compensation signals are supplied from a gain control circuit. The DC compensation is preserved by means of an additional network which senses the DC bias of the amplifier and the DC bias of the gain control circuit, and corrects for deviations of the amplifier bias and the gain control circuit bias from a prescribed mutual relationship.

According to a feature of the invention, the sensed DC bias of the gain control circuit corresponds to a reference voltage which is employed to establish the black reference level of a video signal. In one embodiment the video signal black reference level is established during periodic image blanking intervals by modifying the charge on an AC signal coupling capacitor which couples video signals to the amplifier, in response to the difference between the sensed DC bias of the amplifier and the sensed DC bias reference voltage of the gain control circuit.

Figure 1:
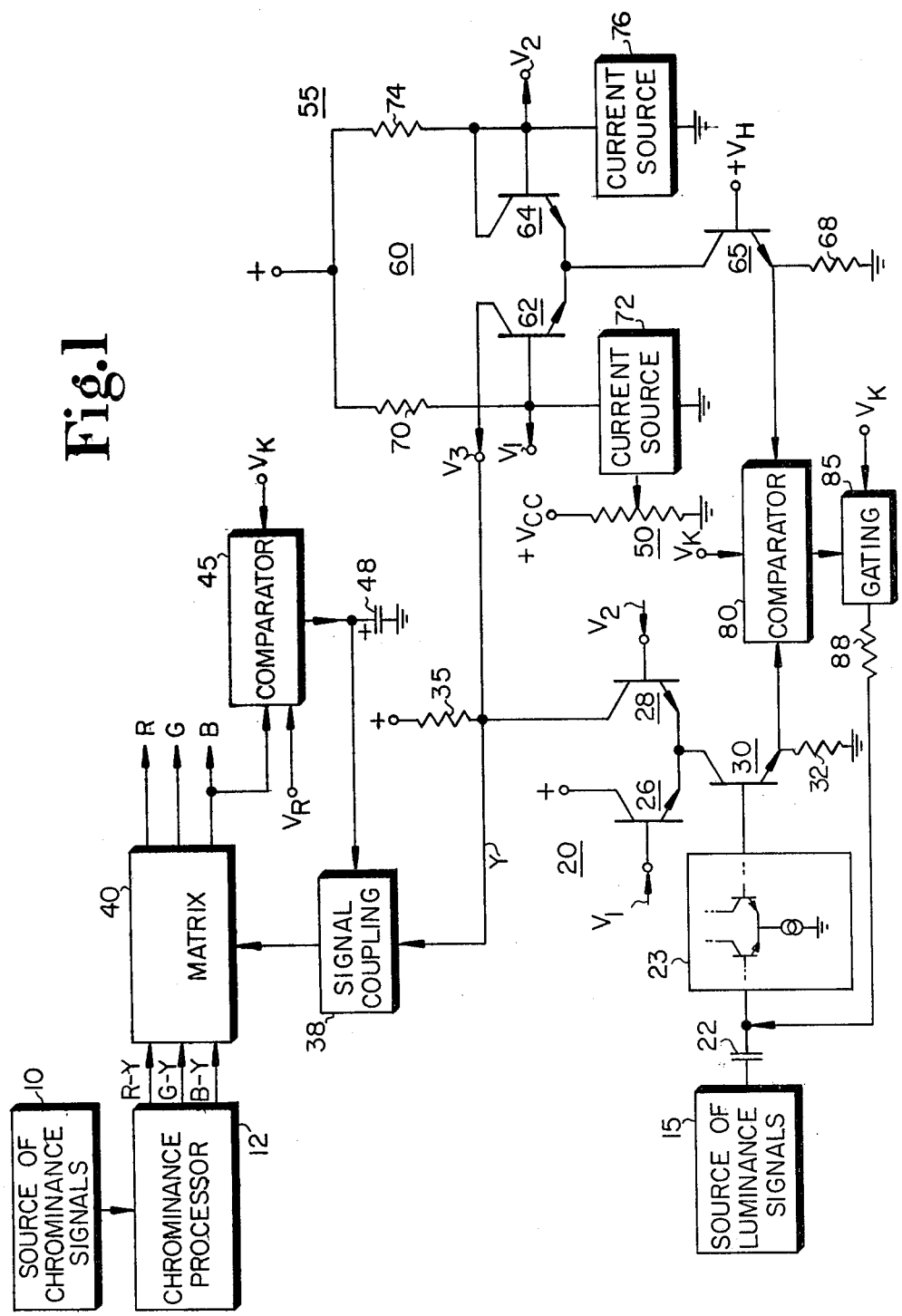
FIG. 1 shows a portion of a color television receiver, partly in block diagram form and partly in schematic circuit diagram form, comprising a DC compensated video signal gain control arrangement including control apparatus according to the invention.

In FIG. 1, chrominance signals from a source 10 are supplied to a chrominance processor 12 for developing R-Y, G-Y and B-Y color difference signals.

Luminance signals from a source 15 are coupled to a differential amplifier 20 via an input AC coupling capacitor 22 and signal processing circuits 23. A capacitor such as capacitor 22 is normally included in the receiver for the purpose of luminance signal AC coupling. However, as will be explained below, in the present arrangement capacitor 22 also serves as a storage device for establishing the black reference level of the luminance signal. Differential amplifier 20 comprises differentially connected transistors 26, 28 and a current source including a transistor 30 and an associated emitter resistor 32. Luminance signals to be amplified are applied to transistors 26 and 28 via current source transistor 30, and amplified luminance signals appear across a load impedance 35 in the collector circuit of transistor 28. Amplifier 20 is gain controlled in response to voltages $V_1$ and $V_2$ applied to transistors 26 and 28, as will be discussed.

The amplified luminance signal (Y) from amplifier 20 is coupled via a coupling network 38 to a matrix amplifier 40 where the luminance signal is combined with the color difference signals from processor 12 for producing output color image representative signals R, G, B. These signals are ultimately supplied to a color kinescope of the receiver for producing a color image.

The DC black reference level of the R, G, B color signals is maintained at a desired level by means of a network including a comparator 45 and an associated charge storage capacitor 48. Comparator 45 is keyed by signal $V_K$ to operate during that portion of each horizontal line blanking interval which contains the video signal black reference level. Specifically, comparator 45 operates during the so-called "back porch" interval of each horizontal line blanking interval, following the horizontal sync pulse interval. When operating, comparator 45 compares a reference voltage $V_R$ with the DC black reference level then appearing at the B (Blue) signal output of matrix 40. Comparator 45 develops an output control signal representative of the difference between reference voltage $V_R$ and the sensed black level of signal B. The output control signal is stored on capacitor 48 and is supplied to coupling network 38 for modifying the DC black reference level of the luminance signal which is applied to matrix 40. The modified black reference level of the luminance signal is in a direction to minimize the difference between reference voltage $V_R$ and the sensed black level of the B signal, so that a desired video signal black level condition is produced. By this mechanism, undesired shifts of the black level of signals R, G, B due to temperature variations, for example, are compensated for. The operation of comparator 45 is described in greater detail in U.S. Pat. No. 4,197,557.

As mentioned previously, differential amplifier transistors 26, 28 are gain controlled in response to input control voltages $V_1$ and $V_2$. These control voltages are provided from a gain control circuit including a viewer adjustable contrast control potentiometer 50 and an associated gain control signal translating circuit 55.

Gain control signal translating circuit 55 is described in detail in a copending U.S. patent application Ser. No. 296,865 of L. A. Harwood, et al., titled, "CIRCUIT FOR LINEARLY GAIN CONTROLLING A DIFFERENTIAL AMPLIFIER", herein incorporated by reference. Briefly, circuit 55 includes a differentially connected current divider network 60 comprising an amplifier transistor 62 and a diode-connected transistor 64, and a current source including a transistor 65 with an associated emitter resistor 68 for supplying operating currents to transistor 62 and diode-connected transistor 64. Transistor 62 and diode-connected transistor 64 are biased by means of current source 65, 68, and by means of a symmetrical bias network comprising a resistor 70 and an associated controlled current source 72 coupled to transistor 62, and a resistor 74 and a current source 76 coupled to diode-connected transistor 64. The conduction of current source 72 varies substantially linearly with the setting of control 50.

Circuit 55 is arranged so that mutually differential control voltages $V_1$ and $V_2$, developed at the base electrodes of transistor 62 and diode-connected transistor 64, vary with the setting of gain control voltage source 50. The differential control voltage $V_1-V_2$ includes a non-linear component (associated with control voltage $V_2$) such that, when control voltages $V_1$ and $V_2$ are applied to transistors 26 and 28 of amplifier 20, the signal gain of amplifier 20 is caused to vary substantially linearly with respect to the gain control voltage from control 50.

A DC compensation voltage $V_3$ derived from the collector output of transistor 62 is DC coupled to the collector output circuit of transistor 28 of luminance amplifier 20. This connection serves to maintain the quiescent DC collector output voltage of transistor 28 substantially constant as differential amplifier 20 is gain controlled in response to control voltages $V_1$ and $V_2$. As control 50 is adjusted, the DC collector currents of transistor 62 of gain control circuit 55 and transistor 28 of amplifier 20 vary substantially equally in magnitude but oppositely in direction. Thus, the DC current through and the voltage drop across amplifier load resistor 35 advantageously remain substantially constant as control 50 is adjusted.

The quiescent operating current of luminance amplifier 20 is a function of the current provided by current source transistor 30, and the quiescent operating current of current divider 60 in gain control circuit 55 is a function of the current provided by current source transistor 65. When the quiescent currents of amplifier 20 and current divider 60 exhibit a predetermined relationship, the collector currents of transistors 28 and 62 vary in a complementary sense such that the quiescent output voltage of amplifier transistor 28 remains substantially constant as amplifier 20 is gain controlled as discussed.

The desired DC compensation of the output of amplifier 20, wherein the DC output voltage does not vary as amplifier 20 is gain controlled, can be disrupted if, for example, the quiescent currents provided by current source transistors 30 and 65 deviate from the predetermined mutual relationship. In this example, the quiescent currents provided by transistors 30 and 65 are substantially equal whereby equal quiescent voltage drops are developed across emitter resistors 32 and 68. This equality can be upset if the quiescent base bias voltage of current source transistor 30 varies relative to the base bias voltage of transistor 65.

The quiescent base bias voltage of transistor 30 is a function of the quiescent output voltage from DC coupled signal processing circuits 23. Signal processing circuits 23 include an input differential amplifier, as shown schematically, and may also include other DC coupled signal amplification, signal peaking and DC level translation networks as required to provide appropriately translated luminance signals to amplifier 20 via the base input of current source transistor 30. The quiescent currents provided by current source transistors 30 and 65 can deviate from the desired equality due to shifts in the operating parameters of the circuits within unit 23 caused by the effects of temperature and supply voltage variations, for example.

Any quiescent biasing error of transistor 30 relative to transistor 65 which introduces a difference between the quiescent currents provided by current source transistors 30 and 65 is manifested by a mutual difference in the voltage drops developed across equal value emitter resistors 32 and 68. This difference, or biasing error, is corrected by means of a control circuit including a comparator 80, as follows.

Comparator 80 operates during the "back porch" (black reference level) time of horizontal image line blanking intervals in response to keying signals $V_K$. At this time, comparator 80 senses the quiescent emitter voltages of current source transistors 30 and 65, and provides an output control signal representative of the difference between these sensed emitter voltages. The control signal is transmitted via a comparator output gating network 85 and a resistor 88 to the output plate of input AC coupling capacitor 22. Gating network is keyed in response to signal $V_K$ to conduct the comparator output signal to capacitor 22 during the video signal black reference level intervals. Additional details concerning the operation of gating network 85 and impedance 88 are disclosed in a copending U.S. patent application Ser. No. 296,823 of R. L. Shanley, II, et al., titled, "STABILIZED VIDEO SIGNAL CONTROL LOOP", herein incorporated by reference.

The comparator output control signal coupled to capacitor 22 exhibits a sense and magnitude for modifying the charge on capacitor 22 such that the DC base bias voltage of transistor 30 is caused to substantially equal the DC base bias voltage of transistor 65 by means of closed loop action, whereby the quiescent emitter voltage of transistor 30 is caused to equal the quiescent emitter voltage of transistor 65. Thus, the network including comparator 80 tends to minimize the difference between the quiescent base and emitter voltages of current source transistors 30 and 65. Accordingly, the currents provided by these current source transistors are maintained substantially equal, so that the desired DC compensation of the output voltage of amplifier 20 is also maintained as amplifier 20 is gain controlled.

If the output of amplifier 20 is not DC compensated as discussed, the quiescent output voltage of amplifier 20 would shift as amplifier 20 is gain controlled. This DC shift would be manifested in the R, G, B output signals of matrix 40, and would be sensed and corrected by the network including comparator 45 as discussed previously. However, the time constant associated with charging and discharging of comparator output capacitor 48 is such that the voltage on capacitor 48 does not change instantaneously in response to the output error control signal from comparator 45, thereby producing a transient correction delay. Accordingly, a video signal DC level shift caused by adjustment of gain control potentiometer 50 would be manifested as a momentary fading or disturbing bright flash in a reproduced picture. This manifested effect is prevented by means of the control arrangement including comparator 80, since comparator 80 operates to maintain the mutual quiescent current balance of amplifier 20 and gain control circuit 55 necessary for proper gain control DC compensation. Thus, comparator 45 is advantageously required to respond only to relatively long-term, slowly varying changes of the output video signal black reference level (e.g., due to temperature changes or component aging).

Comparator 80 also advantageously serves as a luminance signal black level clamp in conjunction with input coupling capacitor 22. In this regard it is noted that the DC black reference level of the luminance signal can vary for several reasons. In particular, the DC black reference level shifts significantly due to AC signal coupling via input coupling capacitor 22, particularly in response to a change in the luminance signal duty cycle. A change in the luminance signal duty cycle occurs with a change in the luminance signal content when, for example, the luminance signal content changes from predominantly white-level information to predominantly dark-level information or vice-versa (i.e., when the corresponding picture changes from a light to a dark scene).

The black level sample and hold clamping arrangement comprising comparator 80 and coupling capacitor 22 sets (i.e., clamps) the luminance signal black reference level to a desired level during each black reference level interval preceding the image information interval, so that the light-to-dark gray scale information of an image is reproduced faithfully. In this respect, input coupling capacitor 22 serves as a charge storage device for a black level error correcting control signal provided by comparator 80, and the fixed emitter voltage of transistor 65 serves as a black level reference voltage.

In operation, the reference voltage at the emitter of transistor 65 is compared with the luminance signal black reference level during each horizontal blanking interval. The output control signal from comparator 80 is representative of the difference between the sensed luminance signal black reference level and the sensed emitter reference voltage of transistor 65. This control signal modifies the charge on input coupling capacitor 22 in a direction to minimize the difference between the sensed signals, whereby the desired luminance signal black level reference is established according to the emitter reference voltage of transistor 65. When this result is achieved, the DC emitter voltages of current source transistors 30 and 65 are substantially equal, whereby the quiescent DC operating currents provided by these transistors are substantially equal and gain control DC compensation at the output of luminance amplifier 20 is maintained as discussed previously.

In addition to maintaining gain control DC compensation and establishing the black reference level of the video signal, the clamping arrangement including comparator 80 provides an additional advantage when, as in this example, the input circuit of signal processing circuits 23 comprises an input differential amplifier including a pair of emitter coupled, base input transistors. A differential amplifier of this type exhibits a non-linear input-versus-output signal transfer response over much of the operating range of the differential amplifier. A luminance signal will produce gray-scale errors in a reproduced image if the luminance signal is processed non-linearly. Such errors can be eliminated by compensating the differential amplifier so that it operates linearly over a wide conduction range, by applying luminance signals with relatively small peak-to-peak amplitude variations to the differential amplifier to assure that the luminance signal will be processed within the linear operating region of the differential amplifier even when the black reference DC level of the luminance signal shifts (e.g., due to the effects of temperature and component tolerance effects), or by other means.

The luminance signal black level clamping action of comparator 80 serves to predictably set the black reference level relative to the transfer characteristic of a differential amplifier so that normally expected peak-to-peak variations of the luminance signal picture information (i.e., variations from light to dark picture information) remain within the linear operating region of the differential amplifier. This permits relatively large amplitude, wide dynamic range signals to be applied to the differential amplifier. That is, the dynamic range of the input luminance signal can be made large enough to take full advantage of the linear operating region of the amplifier. The use of such signals with a wide dynamic range also advantageously results in a good signal-to-noise response. In addition, linearity is maintained during duty cycle changes of the video signal when the input signal applied to capacitor 22 is clamped by preceding circuits (e.g., by preceding intermediate frequency signal processing circuits, as is common).

An additional advantage is provided when the described arrangement is included in a television receiver also comprising a circuit for automatically limiting excessive beam currents conducted by an image reproducing kinescope of the receiver. A circuit for developing an automatic beam current limiting control voltage can be of the type as shown in U.S. Pat. No. 4,253,110—Harwood, et al., for example. Such a control voltage can be used in the system described herein by applying the beam limiter control voltage to the input of current source 72 to which control 50 is coupled, with a sense for reducing the gain of amplifier 20, and thereby reducing the amplitude of the video signal, so that excessive beam currents are limited. Since the DC level of the output signal from amplifier 20 does not change in response to the beam limiting control voltage, the output voltage from comparator 45 and thereby the voltage on capacitor 48 do not change. It is desirable to keep the output voltage from comparator 45 from changing in this case to prevent a visible, gradual change in the brightness of a reproduced image which can be disturbing to viewers. This visible effect would otherwise be produced because the voltage on a capacitor (i.e., capacitor 48) cannot be changed instantaneously. An additional advantage is that using the beam limiter control voltage in this way in the disclosed system has been found to improve the stability of the closed loop black level clamping network including comparator 80, since this clamping network operates independently of the beam current limiter control network.

Figure 2:
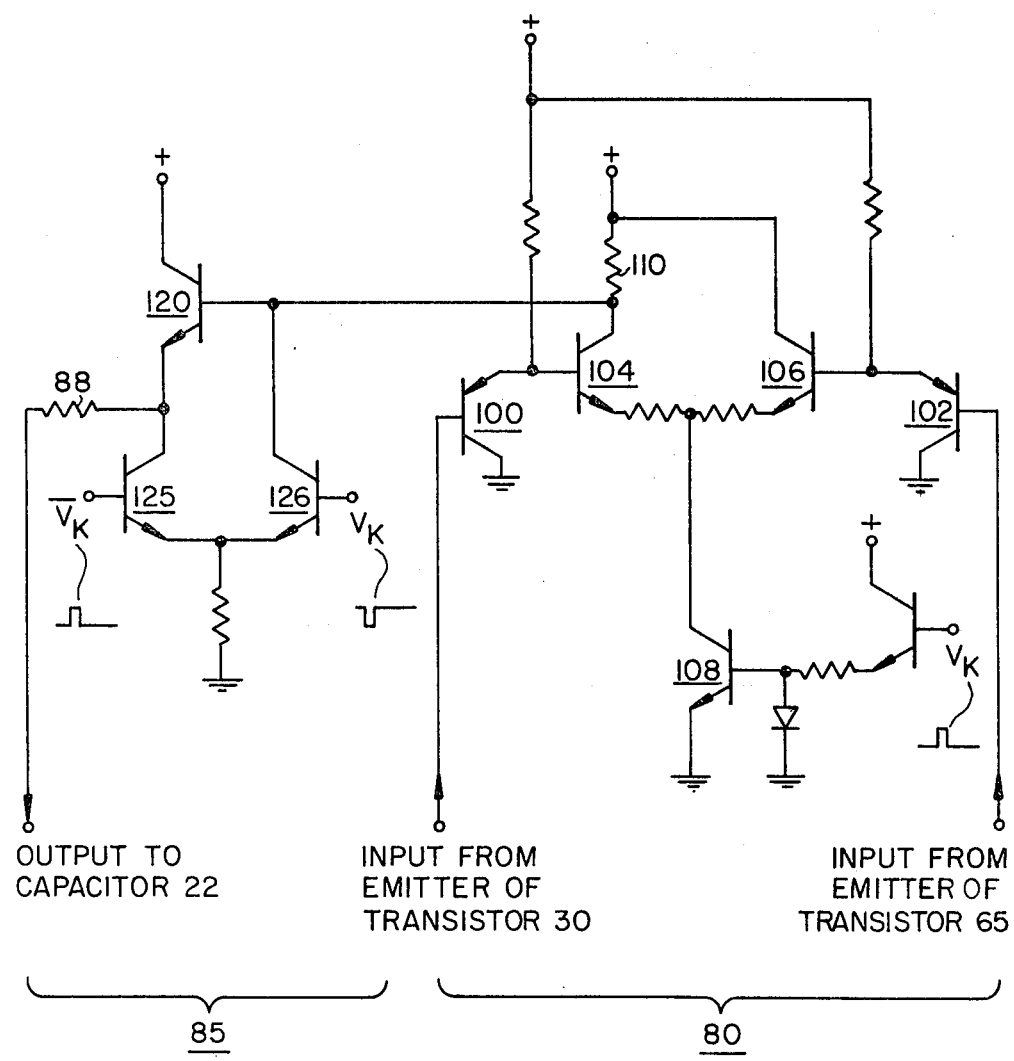
FIG. 2 shows additional circuit details of the control apparatus in FIG. 1.

FIG. 2 shows circuit details of comparator 80 and associated output gating network 85. The emitter voltages of transistors 30 and 65 are applied to comparator transistors 104 and 106 via PNP voltage follower transistors 100 and 102, respectively. Comparator 80 is keyed to operate in response to signal $V_K$ applied to a current source transistor 108 of comparator 80. The comparator output control voltage is developed across a load resistor 110 and is coupled via a gated emitter follower transistor 120 of gating network 85 and impedance 88 to capacitor 22 of FIG. 1. Gating network 85 also includes a switching circuit comprising complementarily switched transistors 125 and 126 respectively coupled to the emitter and base electrodes of transistor 120. The operation of transistors 125 and 126 is controlled by complementary switching signals $V_K$ and $\overline{V_K}$ for forward biasing transistor 120 to conduct during the video signal black reference level intervals, and for reverse biasing transistor 120 at other times.

Figure 3:
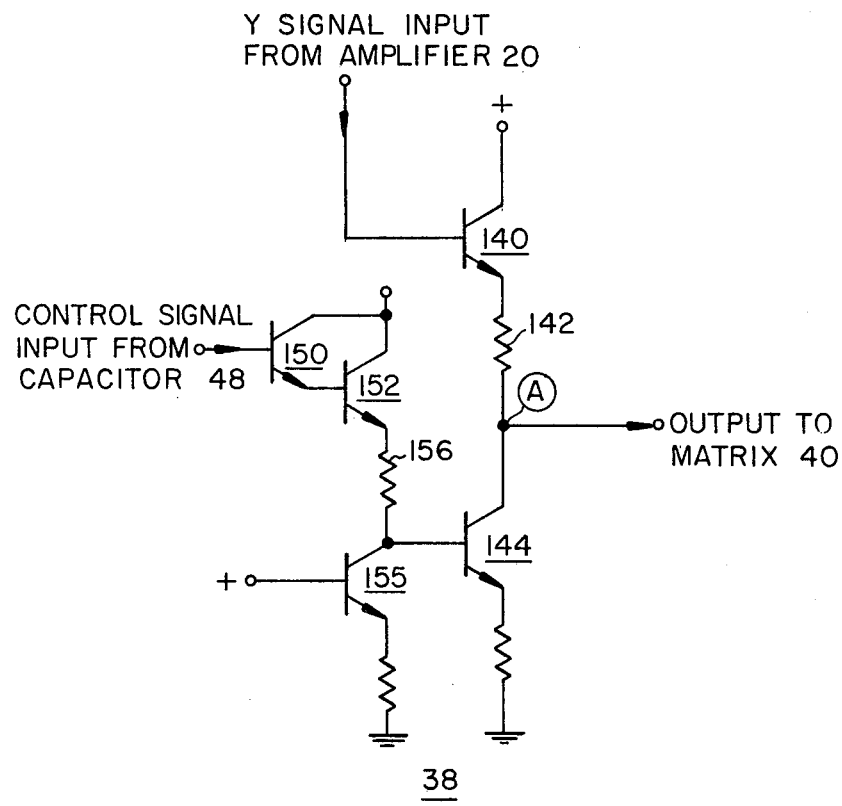
FIG. 3 shows circuit details of another portion of the arrangement of FIG. 1.

FIG. 3 shows circuit details of signal coupling network 38. The luminance signal from amplifier 20 is coupled to matrix 40 via an emitter follower transistor 140 and an emitter resistor 142 coupled to output node A. A transistor 144 provides operating current for transistor 140. The comparator output control voltage from capacitor 48 is coupled via emitter follower transistors 150, 152, a resistor 156 and transistor 144, for modifying the black reference level of the luminance signal appearing at node A. A transistor 155 provides operating current for follower transistors 150 and 152.

What is claimed is:

1. Signal processing apparatus comprising:
    a source of input signals;
    direct current coupled signal processing means responsive to said input signals and including:
        amplifier means with associated bias means for establishing the DC bias of said amplifier means; and
        gain control means with associated bias means for establishing the DC bias of said gain control means, said gain control means providing a gain control signal for controlling the gain of said amplifier means and also providing a DC compensation signal for said amplifier means such that the DC output level of said amplifier means is compensated to remain substantially constant as said amplifier means is gain controlled in response to said gain control signal;
    sensing means responsive to a voltage representative of said DC bias of said amplifier means and to a voltage representative of said DC bias of said gain control means, for providing an output control voltage representative of a deviation of said bias of said amplifier means and said bias of said gain control means from a prescribed mutual relationship; and
    means for coupling said control voltage to said signal processing means for correcting said deviation, so that said DC compensation of said DC output level of said amplifier means is preserved.

2. Apparatus according to claim 1, wherein:
    said bias means for said amplifier means and said bias means for said gain control means comprise respective current sources for providing DC operating supply currents for said amplifier means and said gain control means; and
    said sensing means comprises a comparator for sensing DC voltages respectively representative of the magnitudes of said currents provided by said current sources.

3. Apparatus according to claim 2, wherein:
    said control voltage is coupled to said amplifier means.

4. Apparatus according to claim 3, wherein:
    said control voltage is applied to said current source associated with said bias means for said amplifier means.

5. Apparatus according to claim 1 and further comprising:
    charge storage means for AC coupling input signals from said source to said direct current coupled signal processing means; and wherein
    said control voltage from said sensing means is applied to said AC coupling means for modifying the charge on said AC coupling means with a sense for correcting said bias deviation.

6. In a television receiver system for processing an image representative video signal having periodically recurring image intervals, and image blanking intervals between adjacent image intervals and comprising a black level reference interval, apparatus comprising:
    a source of video signals;
    video signal processing means responsive to said video signals and including:
        amplifier means with associated bias means for establishing the DC bias of said amplifier means; and
        gain control means with associated bias means for establishing the DC bias of said gain control means, said gain control means providing a gain control signal for controlling the gain of said amplifier means and also providing a DC compensation signal for said amplifier means such that the DC output level of said amplifier means is compensated to remain substantially constant as said amplifier means is gain controlled in response to said gain control signal;
    means, operative during said black level reference interval of said video signal, for comparing a voltage representative of said DC bias of said amplifier means with a voltage corresponding to a voltage representative of said DC bias of said gain control means, for providing an output control voltage representative of a deviation of said bias of said amplifier means and said bias of said gain control means from a prescribed mutual relationship;
    charge storage means coupled to the output of said comparing means for developing and storing a voltage corresponding to said control voltage representative of said deviation; and
    means for coupling said stored voltage to said video signal processing means with a sense for correcting said deviation.

7. Apparatus according to claim 6, wherein:
    said charge storage means corresponds to means for AC coupling said input signals from said source to said video signal processing means.

8. Apparatus according to claim 7, wherein
    said video signal processing means comprises an input differential amplifier for receiving AC coupled signals from said charge storage means.

9. In a television receiver system for processing an image representative video signal having periodically recurring image intervals, and blanking intervals containing a black level reference interval between adjacent image intervals, apparatus comprising:
    a source of video signals;
    charge storage AC signal coupling means having an input coupled to said source of video signals, and an output;

video signal processing means responsive to AC coupled output signals from said AC coupling means and including:
  amplifier means with associated bias means for establishing the DC bias of said amplifier means; and
  gain control means with associated bias means for establishing the DC bias of said gain control means, said gain control means providing a gain control signal for controlling the gain of said amplifier means and also providing a DC compensation signal for said amplifier means such that the DC output level of said amplifier means is compensated to remain substantially constant as said amplifier means is gain controlled in response to said gain control signal;
  comparator means, operative during said black level reference interval of said video signal, for comparing a voltage representative of said DC bias of said amplifier means with a voltage corresponding to a voltage representative of said DC bias of said gain control means, for providing an output control voltage representative of a deviation of said bias of said amplifier means and said bias of said gain control means from a prescribed mutual relationship; and
  means of coupling said output control voltage to said AC coupling means for modifying the charge stored thereby with a sense for modifying said bias of said amplifier means in a direction for correcting said deviation.

10. Apparatus according to claim 9, wherein said video signal processing means comprises an input differential amplifier for receiving AC coupled signals from said AC coupling means.

11. Apparatus according to claim 9, wherein:
said bias means for said amplifier means and said bias means for said gain control means comprise respective current sources for providing DC operating supply currents for said amplifier means and said gain control means; and
said comparator means compares voltages respectively representative of the magnitudes of said currents provided by said current sources during said black level reference intervals.

12. Apparatus according to claim 11, wherein:
said comparator control voltage is coupled to said current source associated with said bias means for said amplifier means.

13. Apparatus according to claim 11, wherein:
said current source for said amplifier means is responsive to said video signals.

14. Apparatus according to claim 9 and further comprising:
signal translating means responsive to amplified signals from said gain controlled amplifier means for developing an output video signal; and
output clamping means, including a charge storage device responsive to said output video signal for establishing a reference level to determine the DC level of said output video signal.

15. Apparatus according to claim 14 in a color television receiver system including a source of chrominance signals, wherein
said signal translating means corresponds to means for combining said chrominance signals with said signals from said gain controlled amplifier means for developing a color image representative signal; and
said output clamping means responds to said color signal for establishing the DC level of said color signal.

16. Apparatus according to claim 9 in a color television receiver system including a source of chrominance signals, and further comprising
means for combining said chrominance signals with output video signals from said gain controlled amplifier means to produce a color image representative signal; and
output clamping means, operative during said black level reference intervals, for maintaining a desired condition of the black reference level of said color image signal.

17. Apparatus according to claim 16, wherein
said output clamping means comprises a comparator for comparing the black reference level of said color image signal and a reference voltage, for providing an output control voltage representative of the difference between said black reference level and said reference voltage; and a charge storage device for storing said control voltage; and
said stored control voltage is coupled to said combining means for modifying said black reference level of said color image signal in a direction to minimize said difference 18. Signal processing apparatus comprising:
a source of input signals;
signal processing means responsive to said input signals and including:
  first signal translating means with associated bias means for establishing the DC bias of said first translating means; and
  second signal translating means with associated bias means for establishing the DC bias of said second translating means;
sensing means responsive to a voltage representative of said DC bias of said first translating means and to a voltage representative of said DC bias of said second translating means, for providing an output control voltage representative of a deviation of said bias of said first translating means and said bias of said second translating means from a prescribed mutual relationship; and;
means for coupling said control voltage to said signal processing means for correcting said deviation.

19. Apparatus according to claim 18, wherein
said first signal translating means comprises a first current source for providing DC operating supply currents for said first translating means;
said second signal translating means comprises a second current source for providing DC operating supply currents for said second translating means; and
said sensing means responds to first and second voltages respectively representative of the magnitudes of said DC operating supply currents from said first and second current sources, for providing an output control voltage representative of a deviation of said currents from said first and second current sources from a prescribed mutual relationship.

20. Apparatus according to claim 19, wherein
said first signal translating means comprises a differential amplifier and said first current source includes a first transistor and a first resistor;

said second signal translating means comprises a differential amplifier and said second current source includes a second transistor and a second resistor; and said first and second voltages are respectively derived from said first and second resistors.

21. Apparatus according to claim 19, wherein said control voltage is applied to said first current source.

* * * * *